(12) United States Patent
McGowen (10) Patent No.: US 9,167,737 B2
(45) Date of Patent: Oct. 27, 2015

(54) GARDEN IMPLEMENT

(71) Applicant: Michael McGowen, Corvallis, OR (US)

(72) Inventor: Michael McGowen, Corvallis, OR (US)

(73) Assignee: Carts & Tools Technology, Inc., Corvallis, OR (US)

( * ) Notice: Subject to any disclaimer, the term of this patent is extended or adjusted under 35 U.S.C. 154(b) by 93 days.

(21) Appl. No.: 13/900,277

(22) Filed: May 22, 2013

(65) Prior Publication Data

US 2014/0345891 A1 Nov. 27, 2014

(51) Int. Cl.
*A01B 33/02* (2006.01)
*A01B 33/08* (2006.01)

(52) U.S. Cl.
CPC ............. *A01B 33/028* (2013.01); *A01B 33/082* (2013.01)

(58) Field of Classification Search
CPC .. A01B 33/028; A01B 33/082; A01B 33/027; B62D 51/004; A01G 1/12; A01D 78/12
See application file for complete search history.

(56) References Cited

U.S. PATENT DOCUMENTS

| | | | |
|---|---|---|---|
| 1,354,495 A | 10/1920 | Larsen | |
| 1,579,297 A | 4/1926 | Franklin | |
| 1,836,984 A | * 12/1931 | Newsom | ............................ 172/65 |
| 2,803,183 A | 8/1957 | Smithfourn | |
| 2,847,924 A | 8/1958 | Quick | |
| 2,888,994 A | 6/1959 | Hoff et al. | |
| 2,903,077 A | 9/1959 | Kamlukin | |
| 2,943,687 A | 7/1960 | Merry | |
| 3,180,428 A | 4/1965 | Price | |
| 3,452,823 A | 7/1969 | Shapland | |
| 3,504,748 A | 4/1970 | Croft | |
| 3,511,040 A | * 5/1970 | Eberhard et al. | ................. 56/370 |
| 3,550,714 A | 12/1970 | Bellinger | |
| 3,559,743 A | 2/1971 | Hastings | |
| 3,647,005 A | 3/1972 | Boyd | |
| 3,658,135 A | 4/1972 | Thompson | |
| 3,747,687 A | 7/1973 | Bodine | |
| 3,760,884 A | 9/1973 | Webster et al. | |
| 3,792,734 A | 2/1974 | Ellis et al. | |
| 3,901,325 A | 8/1975 | Richards | |
| 4,002,205 A | 1/1977 | Falk | |
| 4,044,841 A | 8/1977 | Baggs et al. | |
| 4,062,408 A | 12/1977 | Enters et al. | |
| 4,074,764 A | 2/1978 | Enters | |
| 4,133,390 A | 1/1979 | Reaume | |
| 4,136,983 A | 1/1979 | Dobberpuhl | |
| 4,139,064 A | 2/1979 | Dobberpuhl | |
| 4,164,983 A | 8/1979 | Hoch | |
| 4,165,786 A | 8/1979 | Dobberpuhl | |
| 4,191,259 A | 3/1980 | Boren | |
| 4,213,504 A | 7/1980 | Schneider | |
| 4,214,632 A | 7/1980 | Brookshier | |
| 4,224,996 A | 9/1980 | Dopperpuhl | |
| 4,237,983 A | 12/1980 | Allen | |

(Continued)

*Primary Examiner* — Robert Pezzuto
*Assistant Examiner* — Jessica H Lutz
(74) *Attorney, Agent, or Firm* — Davis Wright Tremaine LLP; George C. Rondeau, Jr.

(57) ABSTRACT

A garden implement that utilizes a hub motor assembly coupled to a frame. One or more working tools may be selectively coupled to a hub body encompassing a hub motor of the hub motor assembly. The working tools are operative to work soil in a garden or other agricultural setting. The hub motor may include a brushless DC motor driven by an electrical power source. The electrical power source may include a battery or an AC power source. Alternatively, the hub motor may be used to drive a wheel which propels the garden implement.

25 Claims, 11 Drawing Sheets

(56) References Cited

U.S. PATENT DOCUMENTS

| | | | |
|---|---|---|---|
| 4,276,940 A * | 7/1981 | Kirkegaard | 172/42 |
| 4,286,670 A | 9/1981 | Ackerman | |
| 4,286,671 A | 9/1981 | Mays | |
| 4,305,470 A | 12/1981 | Anderson | |
| 4,351,396 A | 9/1982 | Moulton | |
| 4,354,564 A | 10/1982 | Nakamura et al. | |
| 4,386,661 A | 6/1983 | Dhaliwal et al. | |
| 4,392,538 A * | 7/1983 | Goertzen | 180/19.1 |
| 4,421,176 A | 12/1983 | Lloyd et al. | |
| 4,452,316 A | 6/1984 | Edwards | |
| 4,483,400 A | 11/1984 | Arndt | |
| 4,501,332 A | 2/1985 | Straayer | |
| 4,541,492 A | 9/1985 | Motruk | |
| 4,567,949 A | 2/1986 | Herscher | |
| 4,591,001 A | 5/1986 | Barbee | |
| 4,640,366 A | 2/1987 | Saito | |
| 4,648,464 A | 3/1987 | Huxley | |
| 4,699,219 A | 10/1987 | Deily et al. | |
| 4,760,758 A | 8/1988 | Murayama | |
| 4,776,405 A | 10/1988 | Durfee et al. | |
| 4,811,794 A | 3/1989 | Greene | |
| 4,834,189 A | 5/1989 | Johnson et al. | |
| 4,911,247 A | 3/1990 | Kuhlman et al. | |
| RE33,238 E | 6/1990 | Moulton et al. | |
| 5,048,616 A | 9/1991 | Hoff | |
| 5,048,617 A | 9/1991 | Haven | |
| 5,085,043 A | 2/1992 | Dyke et al. | |
| 5,163,273 A | 11/1992 | Hubby et al. | |
| 5,197,551 A | 3/1993 | Farley | |
| 5,213,170 A | 5/1993 | Savitski | |
| 5,230,208 A | 7/1993 | Bond et al. | |
| 5,338,078 A | 8/1994 | Basek | |
| 5,353,881 A | 10/1994 | Lee et al. | |
| 5,417,238 A * | 5/1995 | Topham | 137/221 |
| 5,490,370 A | 2/1996 | Cheah et al. | |
| 5,491,963 A | 2/1996 | Jerez | |
| 5,520,253 A | 5/1996 | Kesting | |
| 5,562,166 A | 10/1996 | Griffin | |
| 5,573,069 A | 11/1996 | Shipley | |
| 5,651,418 A | 7/1997 | Jerez | |
| 5,713,420 A | 2/1998 | Altamirano et al. | |
| 5,730,225 A | 3/1998 | Fults | |
| 5,740,869 A | 4/1998 | Sandholzer | |
| 5,810,093 A | 9/1998 | Howard | |
| 5,819,513 A | 10/1998 | Braun et al. | |
| 5,850,882 A | 12/1998 | Link | |
| 5,896,931 A | 4/1999 | Altamirano et al. | |
| 5,937,622 A | 8/1999 | Carrier et al. | |
| 5,960,889 A | 10/1999 | McLaren | |
| 6,092,608 A | 7/2000 | Leger | |
| 6,155,033 A | 12/2000 | Turk | |
| 6,247,539 B1 | 6/2001 | Jerez | |
| 6,260,631 B1 | 7/2001 | Torrez | |
| 6,404,078 B1 | 6/2002 | Thomas et al. | |
| 6,470,766 B2 | 10/2002 | Ohta et al. | |
| 6,488,101 B1 | 12/2002 | Miyahara et al. | |
| 6,540,031 B1 | 4/2003 | Sasaoka | |
| 6,606,845 B1 | 8/2003 | Spies | |
| 6,615,928 B2 | 9/2003 | Dueitt | |
| 6,651,752 B2 | 11/2003 | Sasaoka | |
| 6,662,406 B2 | 12/2003 | Shonfeld | |
| 6,708,774 B2 | 3/2004 | Miyahara et al. | |
| 6,722,445 B2 | 4/2004 | Ohta et al. | |
| 6,729,116 B1 | 5/2004 | Graus et al. | |
| 6,779,611 B2 | 8/2004 | Sugimoto et al. | |
| 6,823,947 B2 | 11/2004 | Nagaoka et al. | |
| 6,843,324 B2 | 1/2005 | Basek | |
| 6,883,616 B2 | 4/2005 | Templeton | |
| 6,904,976 B1 | 6/2005 | Kosch et al. | |
| 6,904,977 B2 | 6/2005 | Kramer et al. | |
| 6,913,557 B2 | 7/2005 | Katagiri et al. | |
| 6,920,939 B2 | 7/2005 | Fukuzumi et al. | |
| 6,945,333 B1 | 9/2005 | Chartraw et al. | |
| 6,962,209 B2 | 11/2005 | Bondeson et al. | |
| 6,968,906 B2 | 11/2005 | Ito et al. | |
| D518,491 S | 4/2006 | Vaughn | |
| 7,040,448 B2 | 5/2006 | Good | |
| D523,026 S | 6/2006 | Vaughn | |
| 7,096,970 B1 | 8/2006 | Burroughs et al. | |
| 7,143,835 B2 | 12/2006 | Fukuzumi et al. | |
| 7,237,620 B2 | 7/2007 | Abenroth et al. | |
| 7,392,854 B2 | 7/2008 | Ikeda et al. | |
| 2003/0178208 A1 | 9/2003 | Abenroth et al. | |
| 2005/0045347 A1 | 3/2005 | Stark et al. | |
| 2005/0133230 A1 | 6/2005 | Roser et al. | |
| 2005/0241838 A1 | 11/2005 | Hurt | |
| 2005/0241839 A1 | 11/2005 | Ballone et al. | |
| 2007/0062076 A1 | 3/2007 | Majkrzak | |
| 2007/0163789 A1 | 7/2007 | Thackery | |
| 2009/0065221 A1 | 3/2009 | McDaniel et al. | |
| 2010/0065291 A1 | 3/2010 | Albin et al. | |
| 2010/0139936 A1 | 6/2010 | Notaras et al. | |
| 2011/0209886 A1 * | 9/2011 | Gendelman et al. | 172/112 |

* cited by examiner

GARDEN IMPLEMENT

BACKGROUND OF THE INVENTION

1. Field of the Invention

The present invention is directed generally to gardening tools, and more specifically, to powered cultivation tools.

2. Description of the Related Art

Tillage is the agricultural preparation of soil by mechanical agitation of various types, such as digging, stirring, and overturning. Examples of human powered tilling methods using hand tools include shoveling, picking, hoeing, and raking. In general, a cultivator or cultivation tool is any of several types of garden or farming implements used for tilling soil. Some types of cultivators include teeth (also called shanks) that pierce the soil as they are dragged through it linearly. Other types of cultivators include machines that use rotary motion of disks or tines to accomplish a similar result.

The rotary tiller is a prime example of a cultivator that uses rotary motion. Rotary tillers are popular with home gardeners or others who have small to midsize gardens. The garden may be tilled a few times using the rotary tiller before planting each crop. In some cases, rotary tillers are powered by a motor operative to rotate the tines at one or more speeds to till the soil and propel the rotary tiller through the soil.

DETAILED DESCRIPTION OF THE INVENTION

Embodiments of the present invention are directed to providing a self-powered, lightweight, and highly maneuverable platform for the operation of precision cultivation tools. This is achieved by the use of an electric motor that is incorporated into a hub body (or "hub") and drives the hub directly. This type of motor is known as a hub motor (also called a wheel hub motor, a wheel motor, or an in-wheel motor). By utilizing a hub motor, the need for a transmission, driveline, differential, and connecting axles is negated. This reduces mechanical losses inherent in every component positioned between a conventional engine and a working tool, and makes the overall device operates more quietly. This feature also reduces the weight of the cultivation tool, which allows for more efficient movement by the operator. Advantageously, hub motors generate high torque at low rotations per minute (RPM) which translates to less weight, less complexity, and better efficiency. By comparison, internal combustion engines need to be operating at a relatively high RPM to create enough torque to do substantial work.

Figure 1:
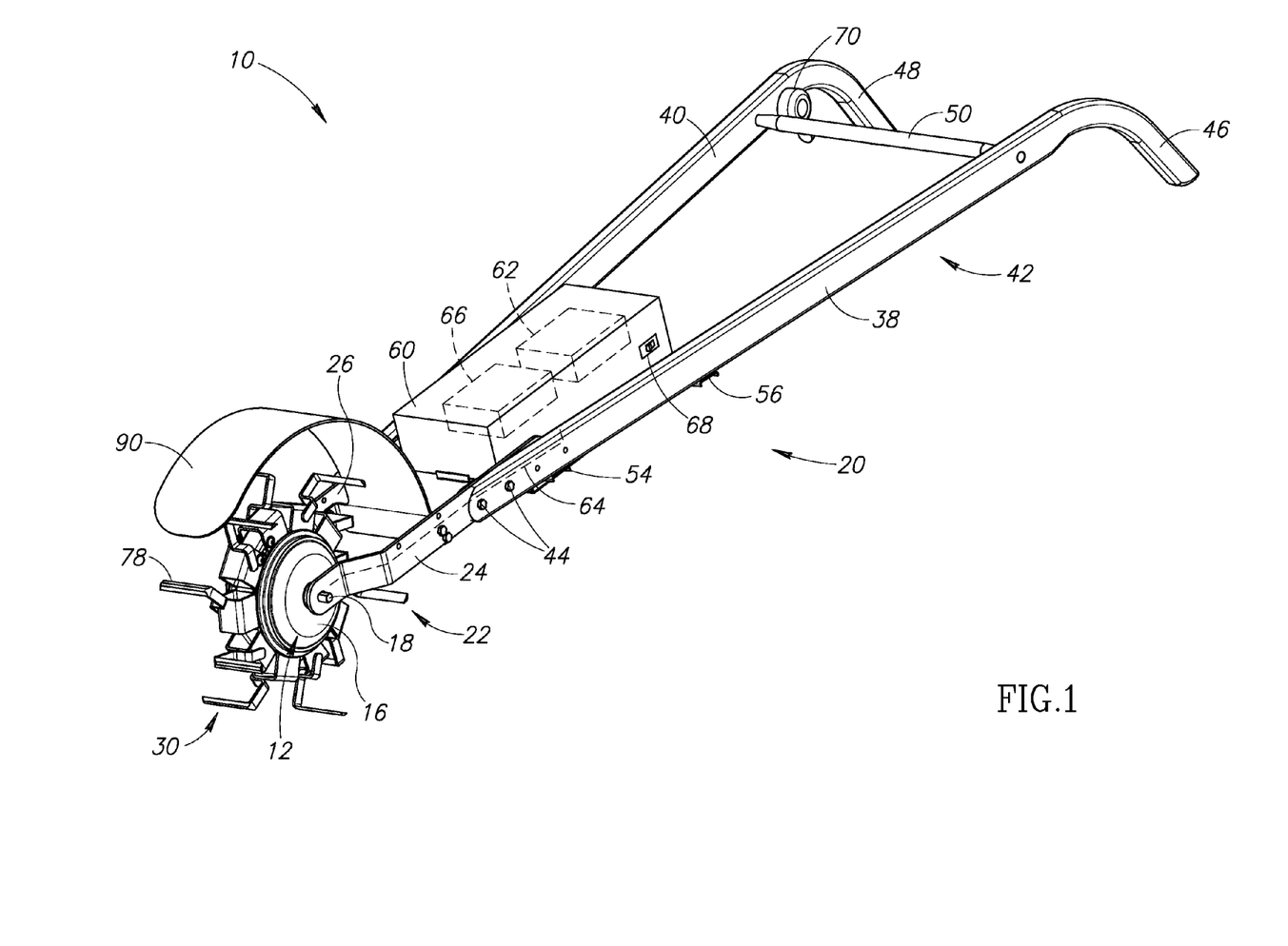
FIG. 1 is a perspective view of a cultivation tool in accordance with a first embodiment of the present invention.
Figure 2A:
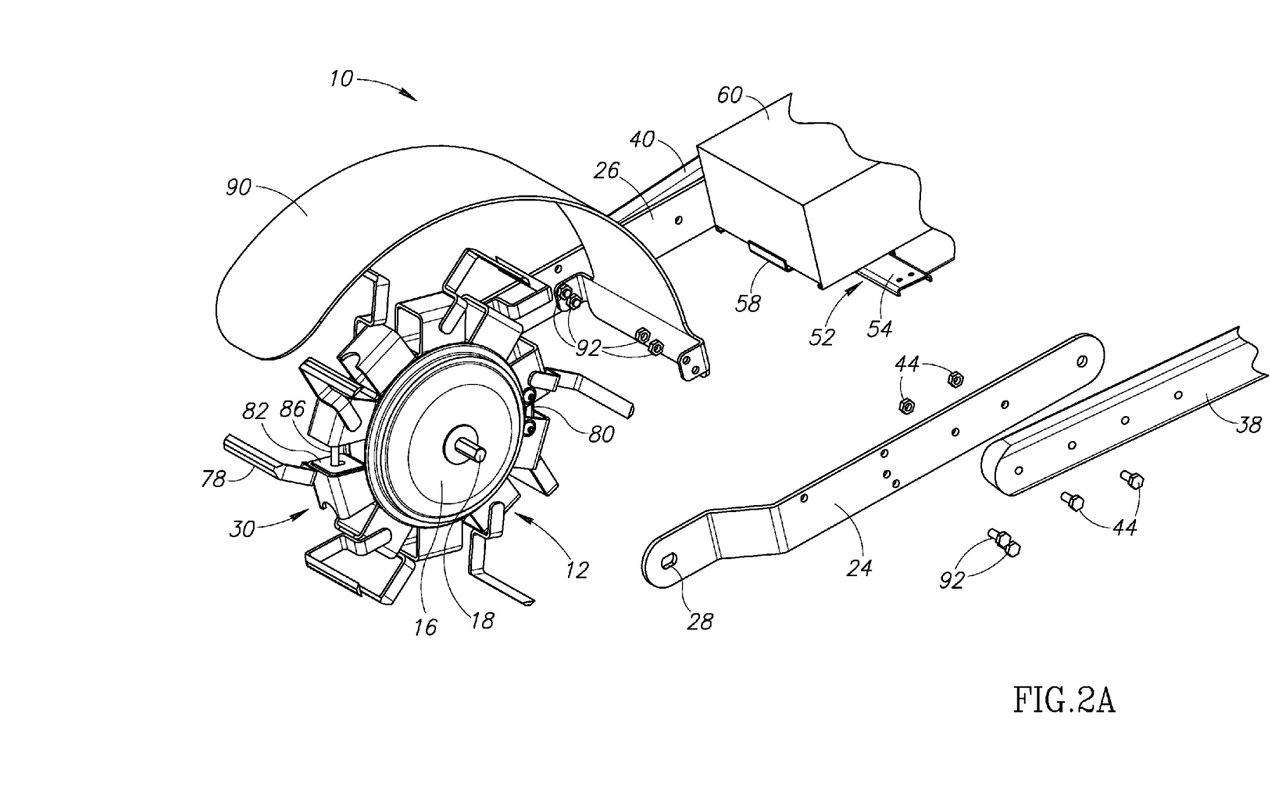
FIG. 2A is an enlarged, partially exploded view of a portion of the cultivation tool of FIG. 1 when a working tool is attached to a hub body of a hub motor.
Figure 2B:
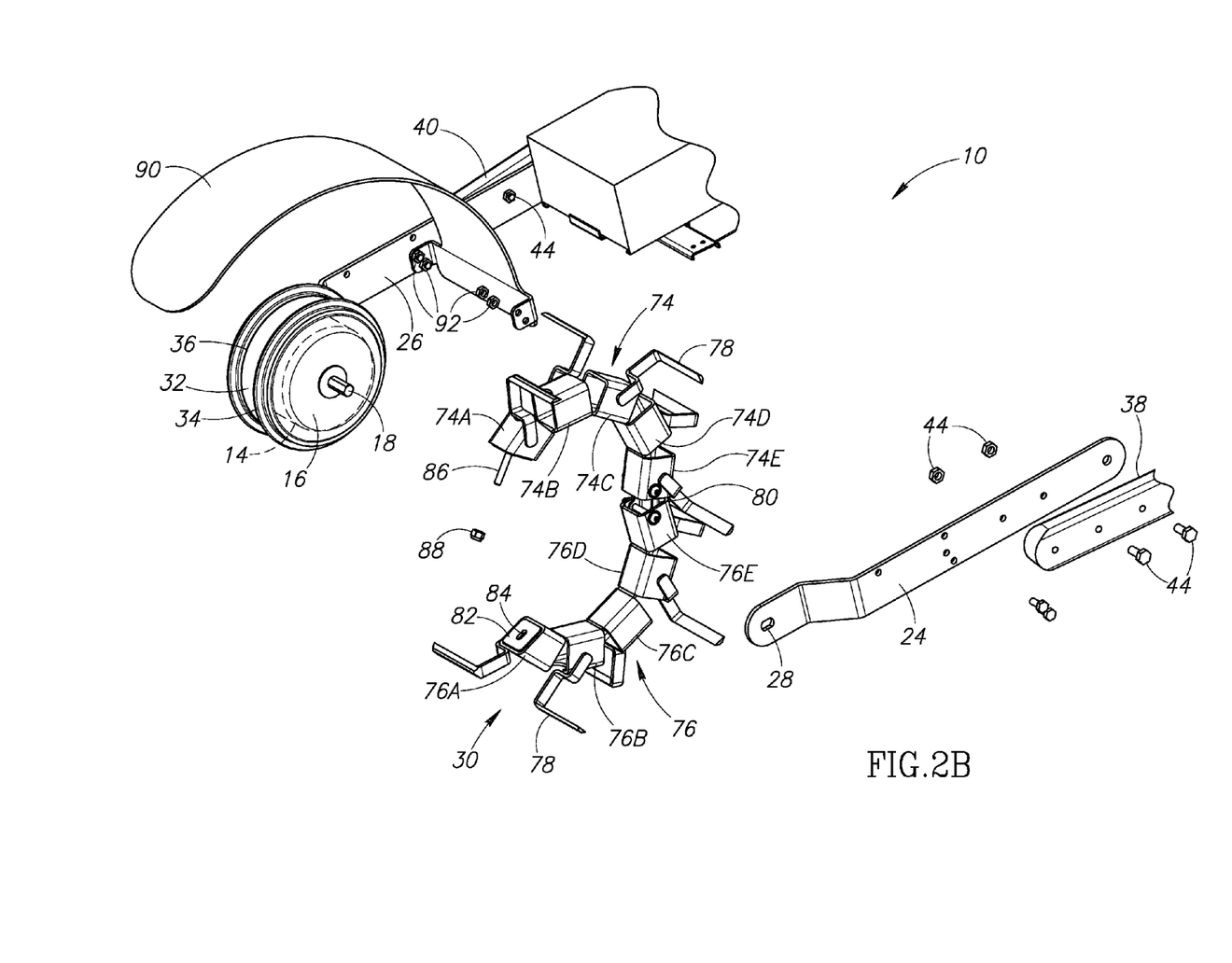
FIG. 2B is an enlarged, partially exploded view of a portion of the cultivation tool of FIG. 1 when the working tool is separated from the hub body of the hub motor.

FIGS. 1, 2A, and 2B illustrate a first embodiment of a cultivation tool 10. The cultivation tool 10 comprises a hub motor assembly 12 comprising a motor 14 (see FIG. 2B), a hub body 16 encompassing the motor and fixedly coupled thereto, and a non-rotating shaft 18. The hub motor 14 (and thus the hub body 16) is configured to rotate about the non-rotating shaft 18 during operation. The cultivation tool 10 also includes a frame 20. The non-rotating shaft 18 is coupled to a lower frame portion 22 of the frame 20 comprising a left leg portion 24 and a right leg portion 26 (see FIG. 2A) each having an aperture therein (e.g., the aperture 28 in the left leg portion 24) for non-rotatably receiving the shaft 18. The left leg portion 24 and the right leg portion 26 may together be referred to as a "fork" or an axle support member. In some embodiments, only one of the leg portions 24 and 26 may be present as an axle support member so that the shaft 18 is supported in a cantilevered manner. In an exemplary embodiment, the hub motor 14 is a brushless direct current (DC) motor. As shown best in FIGS. 2A and 2B, a working tool 30 is removably attachable to an outer circumferential surface 32 of the hub body 16 where it is positioned between two spaced-apart flanges 34 and 36 that each extend radially outward from the outer circumferential surface of the hub body. The working tool 30 is further described herein below.

The left and right leg portions 24 and 26 of the lower frame portion 22 are releasably attached to respective left and right arm portions 38 and 40 of an upper frame portion 42 of the cultivation tool 10. The lower frame portion 22 may be attached to the upper frame portion 42 using any suitable fastener, such as nuts/bolts 44. The left and right arm portions 38 and 40 of the upper frame portion 42 comprise handles 46 and 48, respectively, at their uppermost ends. The upper frame portion 42 also includes a cross brace 50 fixedly disposed between the left arm portion 38 and the right arm portion 40 near the handles 46 and 48 to provide structural support for the left and right arm portions.

Figure 5A:
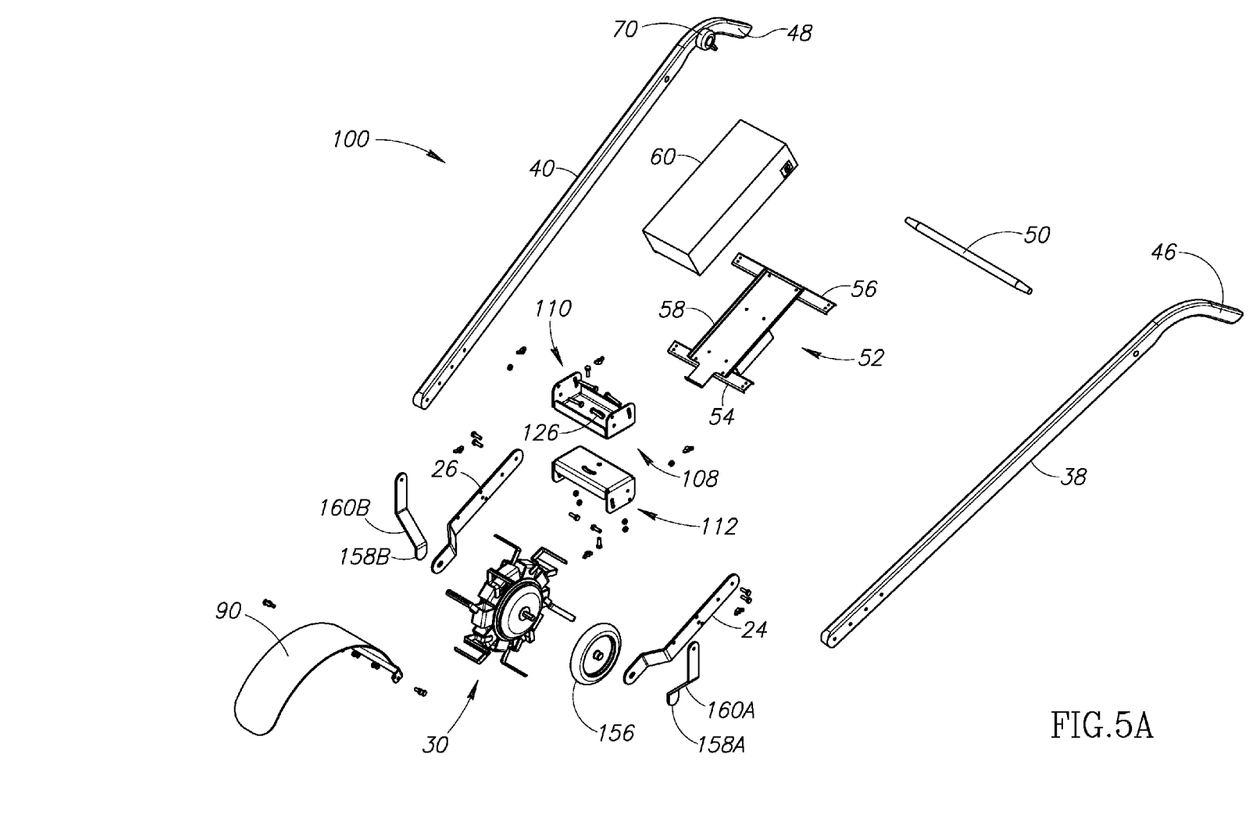
FIG. 5A is an exploded perspective view of the cultivation tool of FIG. 3.

The upper frame portion 42 also includes a power supply module support platform 52 (see FIG. 5A) comprising a lower power supply support member 54 and an upper power supply support member 56 (see FIGS. 2B and 5A) each spanning between the left arm portion 38 and the right arm portion 40 of the upper frame portion 42. The lower power supply support member 54 and the upper power supply support member 56 are coupled to a power supply module mounting body 58 that supports a power supply module 60. The lower power supply support member 54 and the upper power supply support member 56 also function as cross braces disposed between the left arm portion 38 and the right arm portion 40 of the upper frame 42.

The power supply module 60 includes a motor controller 66 configured to control the operation of the hub motor 14. In some embodiments, the motor controller 66 may be located within the hub motor 14 or hub body 16 (see FIGS. 7A and 7B). The motor controller 66 may be operative to control various parameters of the hub motor 14, such as speed, direction, torque, etc. The power supply module 60 may further include a power switch 68 that allows the operator to toggle of and on the power provided to the hub motor 14 and motor controller 66.

In this embodiment, the power supply module 60 further includes a removable power source module 62 (see FIG. 1) which may comprise a battery of one of several battery types having one or more of several voltage ranges. The battery may be a lithium ion battery, a sealed lead acid battery, etc. The battery 62 operatively coupled to the hub motor 14 and the motor controller 66 to provide electrical power to each. The power supply module 60 (i.e., the power source module 62 and the motor controller 66 may be electrically coupled to the hub motor 14 via a cable 64 or other suitable connection.

Figure 3:
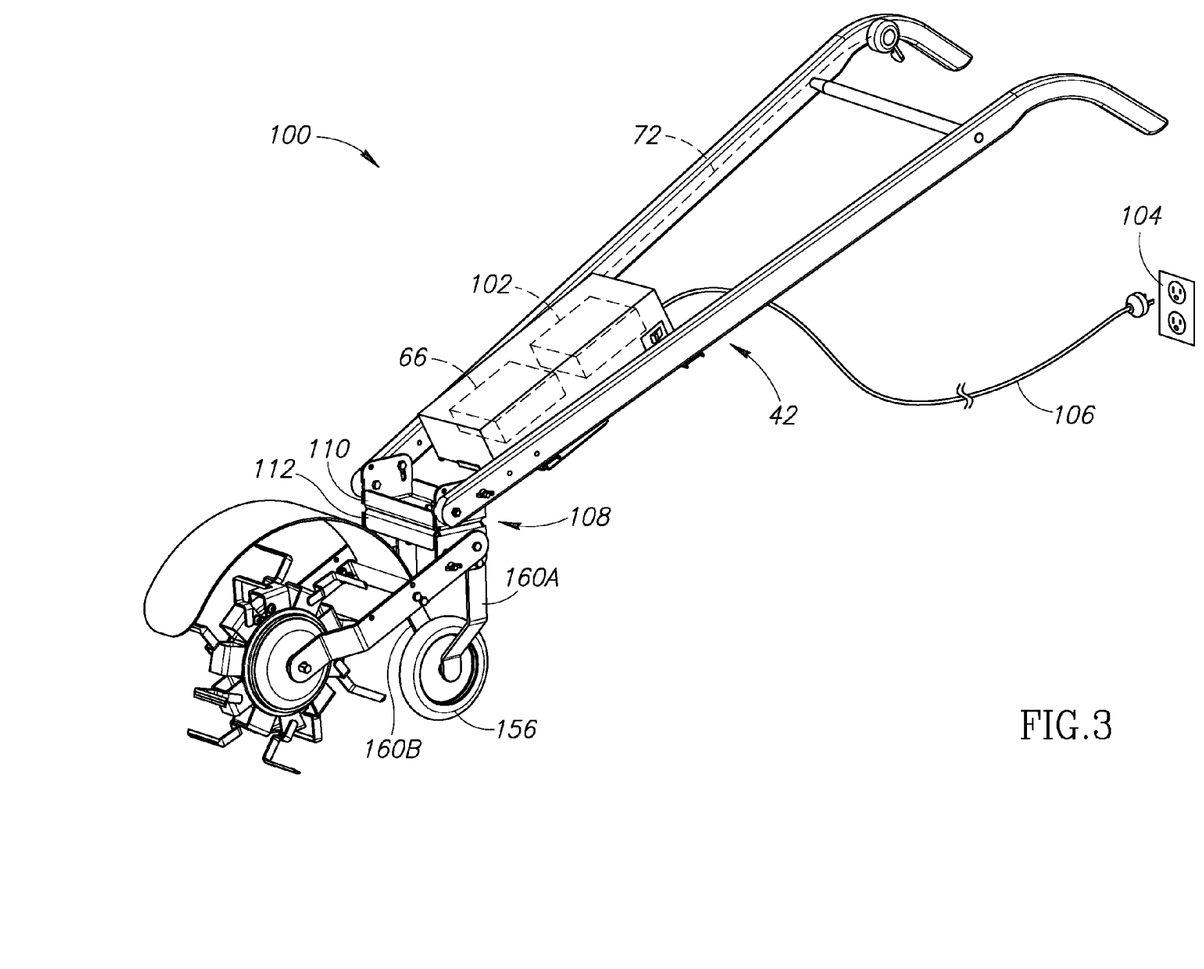
FIG. 3 is a perspective view of a cultivation tool in accordance with a second embodiment of the present invention.
Figure 4A:
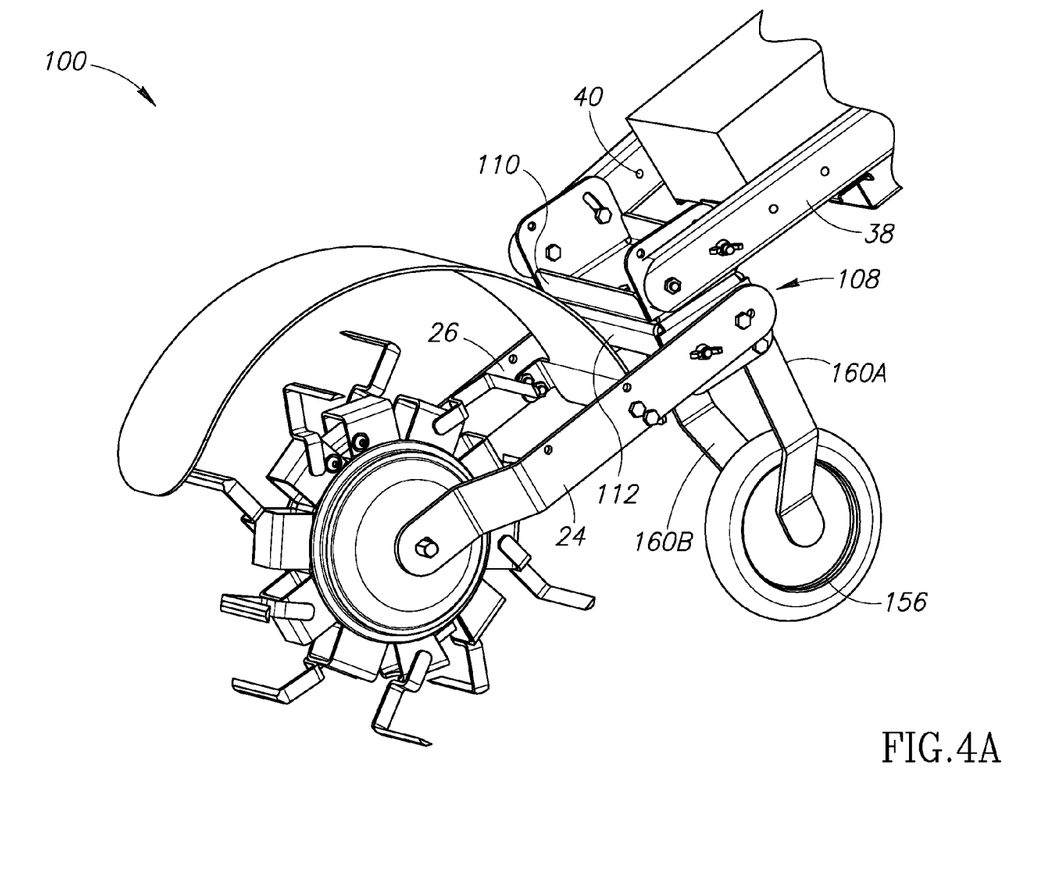
FIG. 4A is an enlarged perspective view of a portion of the cultivation tool of FIG. 3.
Figure 4B:
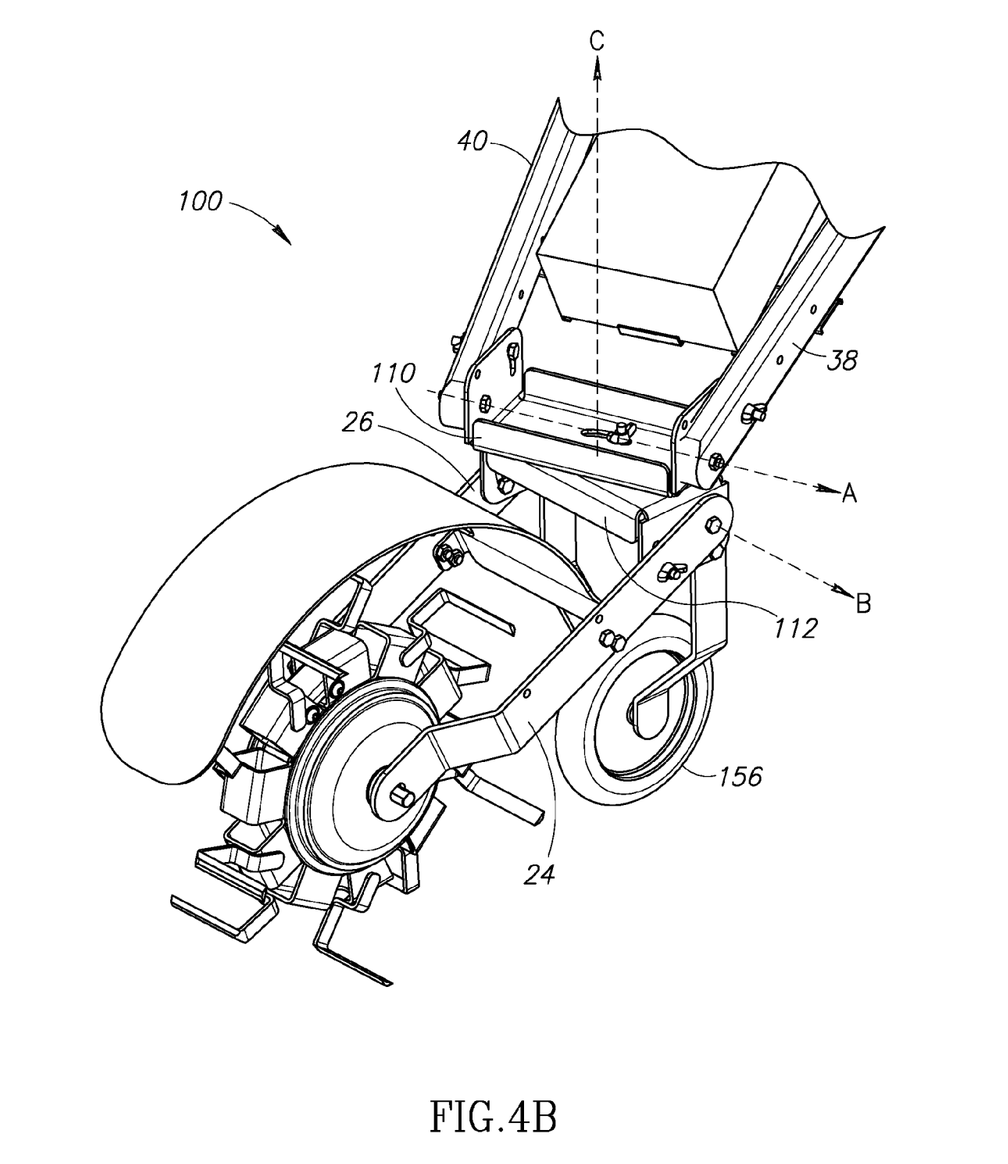
FIG. 4B is an enlarged perspective view of a portion of the cultivation tool of FIG. 3 that illustrates the adjustability thereof.

The motor controller 66 disposed within the power supply module 60 may also be coupled to a user control device or throttle 70 that is operative to allow the user to control the operation of the hub motor 14 and therefore to control the operation of the cultivation tool 10 during use. In some embodiments, the user control device 70 may be operative to drive the hub motor 14 at a continuously variable rate of speed which allows the operator to select the speed most beneficial for the action being performed. For cutting plants at the soil surface, a very high rate of speed may be desired, whereas for incorporating compost into the soil, rotating the hub motor 14 at a lower speed may be more beneficial. And for very precise hoeing of weeds next to a vegetable plant, the hub motor 14 can be driven at an extremely slow rate and maybe not at all while pulling back on the cultivation tool 10, thus simulating a hand tool's action. All of these speed changes can be selected instantaneously with the thumb style user control device 70. Additionally, since the cultivation tool 10 may be relatively lightweight in comparison to other power cultivation tools, it is easy to maneuver and even pick up the cultivation tool 10 while controlling the speed of the hub motor 14. In this embodiment, the user control device 70 is coupled to the right arm portion 44 of the upper frame portion 42 near the handle 48. The user control device 70 may be coupled to the power supply module 60 via a wired or wireless connection (see FIG. 3, which depicts a wired connection 72).

As may best be seen in FIGS. 2A and 2B, the working tool 30 comprises first and second sections 74 and 76, respectively, that are pivotally coupled together at one end of each. In this embodiment, the first and second sections 74 and 76 are substantially identical, but this is not required. The first section 74 includes five segments 74A-E fixedly coupled to each other. Each of the five segments 74A-E includes a tine 78 extending outwardly therefrom. Similarly, the second section 76 includes five segments 76A-E fixedly coupled to each other, wherein each of the five segments includes a tine 78 extending outwardly therefrom.

Segments 74E and 76E of the sections 74 and 76, respectively, are each pivotally coupled to an end of a connecting member 80 via a fastener, such as a bolt. The first and second sections may pivot with respect to each other between an open position shown in FIG. 2B whereat the segments 74A and 74B of the first and second sections, respectively, are spaced apart from each other sufficient to allow the working tool 30 to be positioned over the hub body 16 and onto the outer surface 32 thereof, and a closed position shown in FIG. 2A whereat the working tool is secured or "clamped" onto the outer surface of the hub body. As shown in FIG. 2B, the segment 76A of the second section 76 comprises an outer wall 82 having an aperture 84 therein. Although not shown, the segment 74A of the first section 74 also comprises an outer wall having an aperture therein. A bolt 86 is positioned within the segment 74A and is projecting outwardly therefrom. The aperture 84 of the second section 76 is sized to receive the bolt 86 projecting from the first section 74. To secure the working tool 30 on to the hub body 16 against rotation relative to the hub body, as shown in FIG. 2A, a user may place the first and second sections 74 and 76 on the outer surface 32 of the hub body and pass the bolt 86 of the segment 74A of the first section 74 through the aperture 84 in the wall 82 of the segment 76A of the second section 76. The bolt 86 may be secured in place by a nut 88 (see FIG. 2B) that is insertable into the segment 76A of the second section 76 and threadably engaged with the bolt. The user may tighten the nut onto 88 the bolt 86 to a degree such that the working tool 30 is securely coupled to the hub body 16 for rotation with the hub body, as shown in FIG. 2A.

It should be appreciated that the working tool 30 shown is only one example of a working tool that may be used with the cultivation tool 10. In practice, an operator may have a plurality of working tools that may be selectively attached to and removed from the hub body 16. Thus, the operator can select a working tool that is most appropriate for a particular application. For example, one working tool may be designed to throw dirt whereas another working tool may be designed to cut through weeds.

The cultivation tool 10 also includes a plant guard 90 coupled to the leg portions 24 and 26 of the lower frame portion 22 via fasteners 92. The plant guard 90 may protect surrounding plants from contact by the tines 78 during use. The plant guard 90 may also function to deflect downward any debris that may be flung in the air during operation of the working tool 30.

FIGS. 3, 4A, 4B, 5A, and 5B illustrate another embodiment of a cultivation tool 100. The cultivation tool 100 is similar to the cultivation tool 10 shown in FIGS. 1, 2A, and 2B in many aspects, so only the different features of the cultivation tool 100 are discussed below.

In this embodiment, instead of a battery, the power supply module 60 comprises an AC/DC converter 102 configured to receive AC power from an outlet 104 via a cable 106 and to provide DC power to the hub motor 14. Thus, in this embodiment there is no need to recharge a battery, which allows the cultivation tool 100 to be used for longer periods of time.

In this embodiment, the upper frame portion 42 and the lower frame portion 22 are coupled together by a frame mounting bracket 108. As discussed below, the frame mounting bracket 108 allows for multiple adjustments to be made to the cultivation tool 100 to suit an operator's needs or preferences. The mounting bracket 108 comprises an upper bracket portion 110 and a lower bracket portion 112. In this embodiment, the upper bracket portion 110 and the lower bracket portion 112 are substantially identical, so the components are identified with the same reference numerals with the upper bracket portion components being designated by the letter "A" and the lower bracket portion components being designated by the letter "B." In other embodiments, the upper and lower bracket portions 110 and 112 are not substantially identical.

Figure 5B:
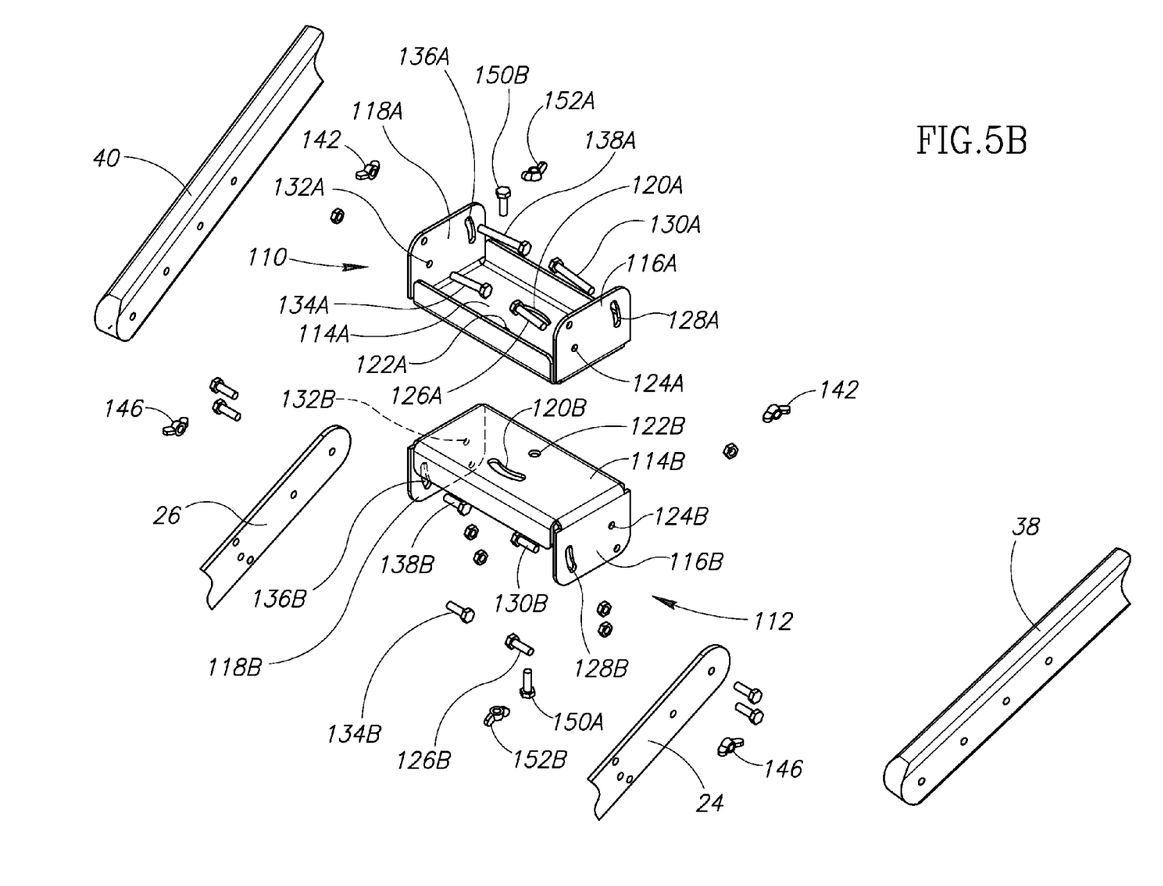
FIG. 5B is an exploded perspective view of a mounting bracket of the cultivation tool of FIG. 3.

As may best be seen in FIG. 5B, the upper bracket portion 110 comprises a base portion 114A, a left sidewall 116A, and a right sidewall 118A. The base portion 114A has an arcuate slot 120A and an aperture 122A therein. The left sidewall 116A includes an aperture 124A sized to receive a bolt 126A, and an arcuate slot 128A sized to slidably engage a bolt 130A. Similarly, the right sidewall 118A includes an aperture 132A sized to receive a bolt 134A and an arcuate slot 136A sized to slidably engage a bolt 138A.

Like the upper bracket portion 110, the lower bracket portion 112 comprises a base portion 114B, a left sidewall 116B, and a right sidewall 118B. The base portion 114B has an arcuate slot 120B and an aperture 122B therein. The left sidewall 116B includes an aperture 124B sized to receive a bolt 126B, and an arcuate slot 128B sized to slidably engage a bolt 130B, and the right sidewall 118B includes an aperture 132B sized to receive a bolt 134B and an arcuate slot 136B sized to slidably engage a bolt 138B.

The upper frame portion 42 (see FIG. 3) is pivotally coupled to the upper bracket portion 110. This is achieved by bolts 126A and 134A that pass through the apertures 124A and 132A, respectively, in the left and right sidewalls 116A and 118A and apertures in the left and right arm portions 38 and 40, respectively, of the upper frame portion 42. Bolts 130A and 138A are also passed through the arcuate slots 128A and 136A in the left and right sidewalls 116A and 118A, respectively, and apertures in the left and right arm portions 38 and 40, respectively. This configuration allows the upper frame portion 42 to pivot about a laterally extending axis A (see FIG. 4B) so that the operator may selectively adjust the height of the upper frame portion and the handles 46 and 48. Wing nuts 142 may be selectively coupled to the bolts 130A and 138A positioned in the arcuate slots 128A and 136A, respectively, to allow the operator to fix the upper frame portion 42 at a desired height. If the operator wishes to change the height of the upper frame portion 42, he may simply loosen the wing nuts 142, adjust the height of the upper frame portion by pivoting it about the axis A, and then re-tighten the wing nuts.

The lower frame portion 22 is pivotally coupled to the lower bracket portion 112. Bolts 126B and 134B pass through the apertures 124B and 132B, respectively, in the left and right sidewalls 116B and 118B and apertures in the left and right leg portions 24 and 26, respectively, of the lower frame portion 22. Bolts 130B and 138B are also passed through the arcuate slots 128B and 136B in the left and right sidewalls 116B and 118B, respectively, and apertures in the left and right leg portions 24 and 26, respectively. This configuration allows the lower frame portion 22 to pivot about a laterally extending axis B (see FIG. 4B) so that the operator may selectively adjust the height of the lower frame portion and the working tool 30 coupled thereto. Wing nuts 146 may be coupled to the bolts 130B and 138B positioned in the arcuate slots 128B and 136B to allow the operator to fix the lower frame portion 22 at a desired height.

The lower bracket portion 112 and the upper bracket portion 110 are pivotally coupled together. The upper bracket portion 110 is positioned so that its sidewalls 116A and 118A extend upward from the base 114A and the lower bracket portion 112 is positioned so that its sidewalls 116B and 118B extend downward from the base 114B. The arcuate slot 120A in the base 114A of the upper bracket portion 110 is aligned with the aperture 122B in the lower bracket portion 112 and a bolt 150A (see FIG. 5B) is passed therethrough. The arcuate slot 120B in the base 114B of the lower bracket portion 112 is aligned with the aperture 122A in the upper bracket portion 110 and a bolt 150B is passed therethrough. The bolts 150A and 150B may be selectively loosened and tighten using wing nuts 152A and 152B, respectively. When the wing nuts 152A and 152B are loosened, the upper bracket portion 110 and the lower bracket portion 112 may pivot relative to each other about an upright axis C (see FIG. 4B) that passes between the arcuate slots 120A and 120B of the upper and lower bracket portions 110 and 112, respectfully. Thus, the operator may selectively pivot the upper bracket portion 110 during use or may fix the upper bracket portion relative to the lower bracket portion 112 at a desired position. By adjusting the lateral position of the handles 46 and 48 by rotating about the axis C, it is possible for an operator to walk behind and operate the cultivation tool 100 from an offset position different from where the cultivation tool is engaging the ground.

In this embodiment, the cultivation tool 100 is supported by a ground-engaging wheel 156 which is rotatably mounted about a lateral axis at distal ends 158A and 158B of arms 160A and 160B, respectively, which are coupled to the lower bracket portion 112. In some embodiments, the distance between the ground-engaging wheel 156 and the lower bracket portion 112 may be adjustable so that the height of the frame mounting bracket 108 may be adjusted as desired. The wheel 156 provides a reference for the depth of the cultivation. The wheel 156 is especially beneficial for maintaining a consistent depth when operating up and down crop rows. The center of gravity of the cultivation tool 100 is located above the wheel 156 thus reducing operator fatigue while maintaining a consistent angle for the working tool 30 relative to the ground, consequently maintaining a consistent depth into the soil.

Figure 6:
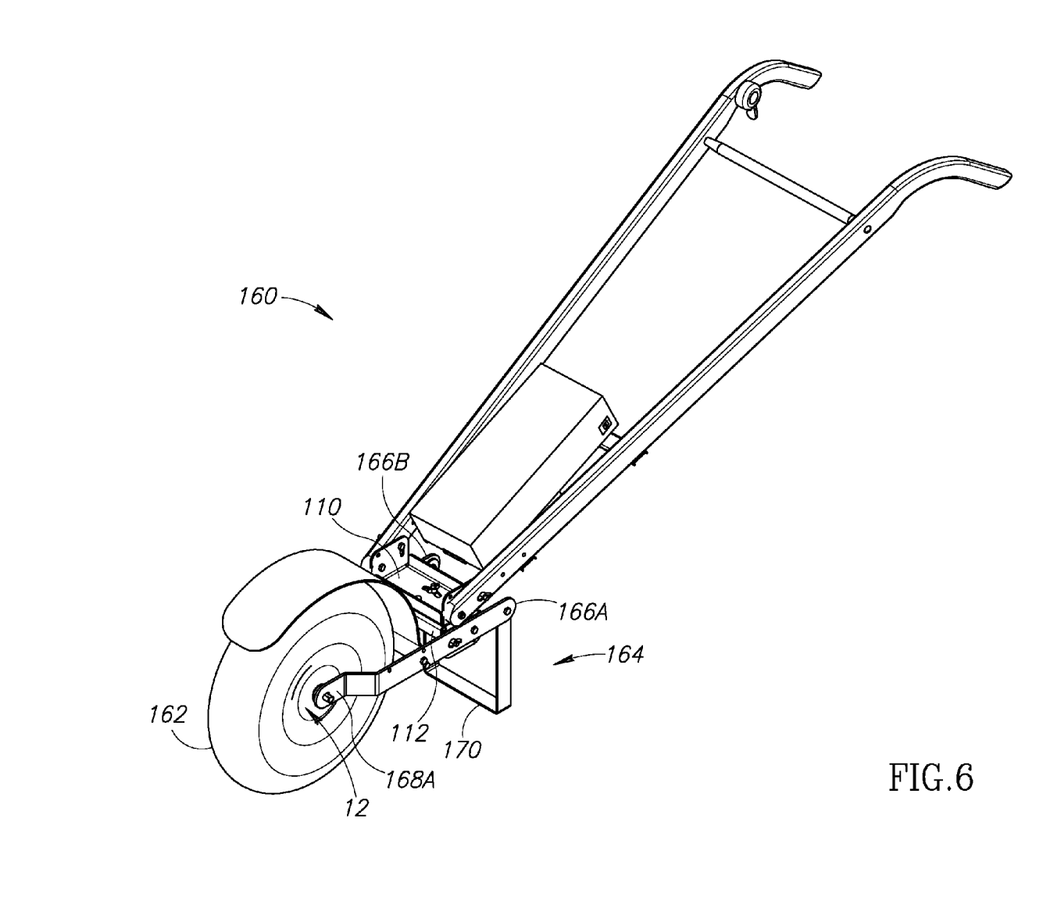
FIG. 6 is a perspective view of a cultivation tool in accordance with a third embodiment of the present invention.
Figure 7A:
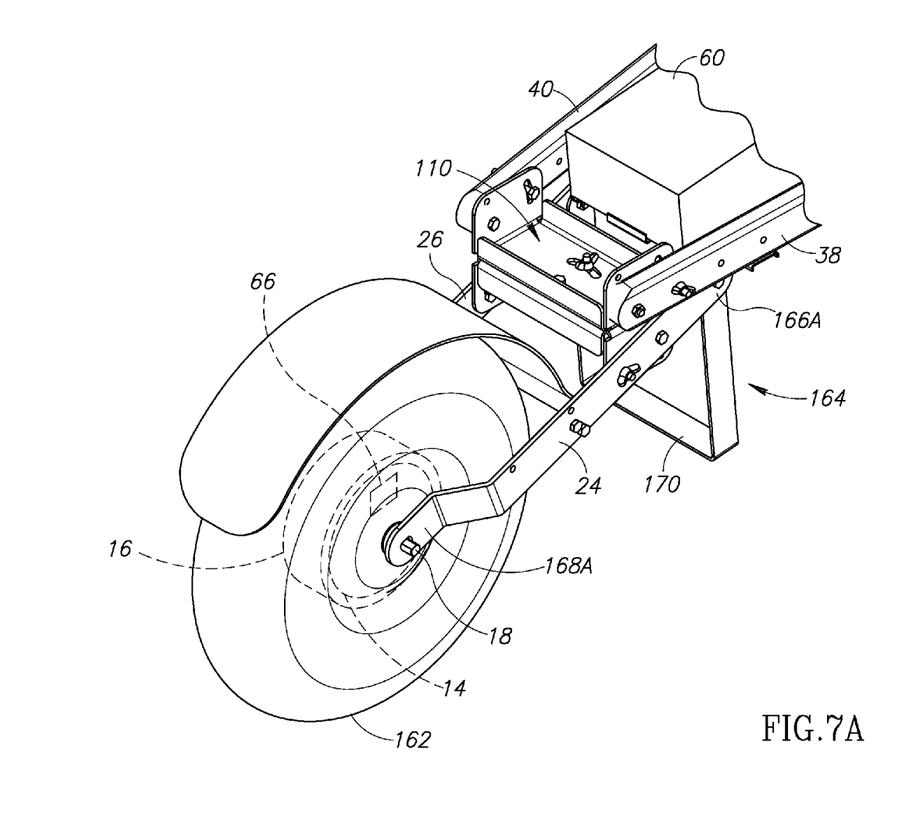
FIG. 7A is an enlarged perspective view of a portion of the cultivation tool of FIG. 6.
Figure 7B:
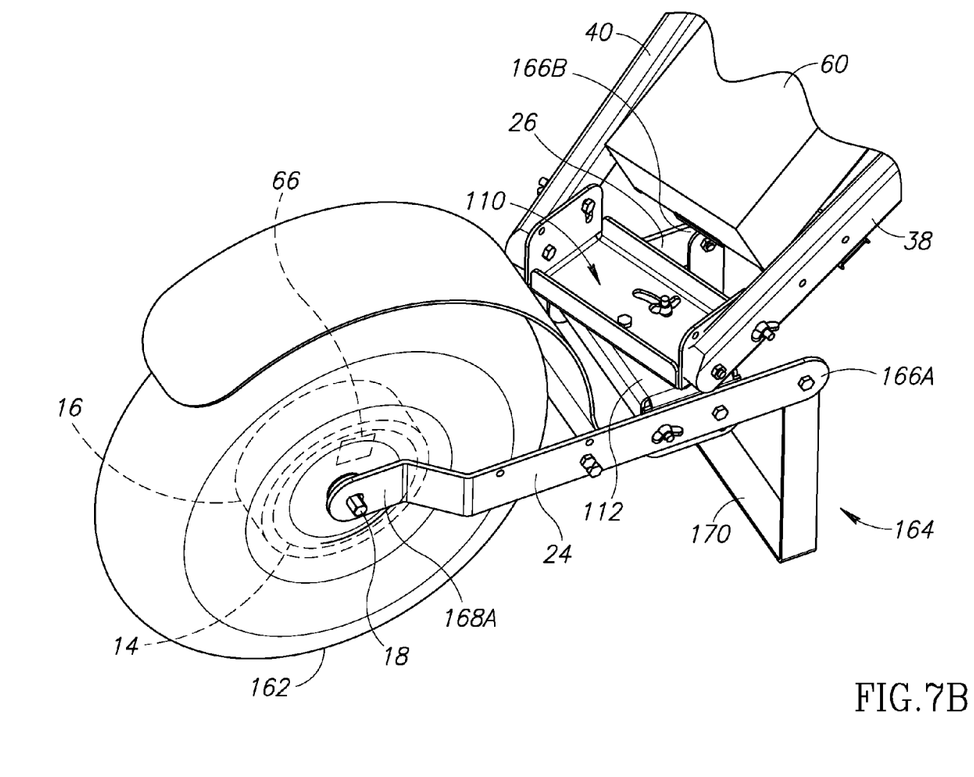
FIG. 7B is an enlarged perspective view of a portion of the cultivation tool of FIG. 6 that illustrates the adjustability thereof.

FIGS. 6, 7A, and 7B illustrate another embodiment of a cultivation tool 160 implemented in the form of a wheel hoe. In this embodiment, a wheel 162 encompasses the hub body 116 and is rotatably driven by the hub motor 14 (rather than the working tool 30 of previously discussed embodiments). In this embodiment, the motor controller 66 is positioned within the hub motor assembly 12, rather than the power supply module 60. A working tool 164 is attached to ends 166A and 166B of the lower leg portions 24 and 26, respectively, of the lower frame portion 22 opposite an end 168A of the lower leg portion 24 and the end (not shown) of the lower leg portion 26 that are coupled to the shaft 18 of the hub motor assembly 12. The working tool 164 extends downward from the ends 166A and 166B and has a horizontal blade portion 170 that is pulled through soil as the wheel 162 rotates and moves the cultivation tool 160 forward. In some embodiments, the working tool 164 may be selectively attachable to the cultivation tool 160 in a manner so that other types of working tools may be used in place of the working tool 164.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A garden implement comprising:
   a frame comprising a lower frame portion including two spaced-apart leg portions, and an upper frame portion comprising two spaced-apart handles;
   a hub motor assembly comprising a horizontal non-rotating shaft, a hub motor mounted on the shaft for rotation thereabout, and a hub body encompassing the hub motor and operative to be rotatably driven by the hub motor, the hub body having an outer surface extending coaxially about the shaft, the shaft protruding laterally outward from the hub body on a left and right side thereof, the leg portions of the lower frame portion being selectively couplable to the shaft;
   a working tool couplable to the hub body, the working tool comprising a plurality of working tool segments serially coupled together and mountable at the outer surface of the hub body extending coaxially about the shaft, the working tool segments being removably clampable to the hub body and configured to rotate therewith as the hub body is rotatably driven by the hub motor; and
   a power supply module coupled to the frame and operatively coupled to the hub motor to provide electrical power thereto.

2. The garden implement of claim 1, further comprising:
   a motor controller operative to control the speed of rotation of the hub motor; and
   a user control device operatively coupled to the motor controller configured to receive user input from a user and control the speed of rotation of the hub motor dependent on the received user input.

3. The garden implement of claim 2, wherein the motor controller is disposed within the power supply module and the user control device is disposed on the upper frame portion near one of the two spaced-apart handles.

4. The garden implement of claim 2, wherein the motor controller is disposed within the hub body.

5. The garden implement of claim 2, wherein the user control device is coupled to the motor controller via a wired connection.

6. The garden implement of claim 1, wherein the power supply module comprises a battery.

7. The garden implement of claim 1, wherein the power supply module comprises an AC/DC power converter operative to receive AC power from an external power source and to deliver DC power to the hub motor.

8. The garden implement of claim 1, further comprising a ground-engaging wheel coupled to the frame and extending downward therefrom.

9. The garden implement of claim 1, wherein the lower frame portion and the upper frame portion are pivotably coupled together and selectively pivotable relative to each other about an upright axis.

10. The garden implement of claim 1, further comprising a frame support bracket comprising a first bracket portion coupled to the lower frame portion and a second bracket portion coupled to the upper frame portion, the first bracket portion and the second bracket portion being coupled together to thereby couple the upper frame portion and the lower frame portion together.

11. The garden implement of claim 10, wherein the first bracket portion and the second bracket portion are selectively pivotable relative to each other about an upright axis.

12. The garden implement of claim 10, wherein the lower frame portion and the first bracket portion are selectively pivotable relative to each other about a laterally extending axis.

13. The garden implement of claim 10, wherein the upper frame portion and the second bracket portion are selectively pivotable relative to each other about a laterally extending axis.

14. The garden implement of claim 1, wherein each of the working tool segments includes a ground engaging member.

15. The garden implement of claim 14, wherein the ground engaging member is a tine.

16. The garden implement of claim 1, wherein at least a plurality of the working tool segments are pivotally connected to an adjacent one of the working tool segments.

17. The garden implement of claim 1, wherein the working tool segments include a first end segment and a second end segment removably connectable together, and at least a plurality of intermediate segments extending between the first and second end segments.

18. The garden implement of claim 17, wherein the plurality of intermediate segments extending between the first and second end segments are each pivotally connected to an adjacent one of the working tool segments.

19. The garden implement of claim 17, further comprising an adjustment member extending between the first and second end segments and adjustable to pull the first and second end segments toward each other to clamp the working tool segments onto the outer surface of the hub body.

20. The garden implement of claim 17, further comprising a coupler attachable to the first and second end segments and operable to allow movement of the first and second end segments to an open position wherein the first and second end sections are spaced-apart from each other such that the working tool segments may be freely removed from the hub body, and a closed position wherein the first and second end segments are substantially adjacent to each other such that the working tool segments may be selectively clamped around the hub body for rotation with the hub body.

21. The garden implement of claim 20, wherein the coupler is a selectively adjustable fastener to allow a user to adjust the force at which the working tool segments are clamped around the hub body.

22. The garden implement of claim 1, wherein the hub body has two axially spaced apart flanges extending coaxially about the shaft and axially spaced apart to receive the working tool segments therebetween and to limit axial movement of the working tool segments.

23. A garden implement comprising:
- a frame comprising a lower frame portion including two spaced-apart leg portions, and an upper frame portion comprising two spaced-apart handles;
- a hub motor assembly comprising a horizontal non-rotating shaft, a hub motor mounted on the shaft for rotation thereabout, and a hub body encompassing the hub motor and operative to be rotatably driven by the hub motor, the shaft protruding laterally outward from the hub body on a left and right side thereof, the leg portions of the lower frame portion being selectively couplable to the shaft;
- a working tool couplable to the hub body and configured to rotate therewith as the hub body is rotatably driven by the hub motor; and
- a power supply module coupled to the frame and operatively coupled to the hub motor to provide electrical power thereto;
- wherein the working tool comprises:
- a first substantially semicircular section having a first end and a second end, and a plurality of tines therebetween;
- a second substantially semicircular section having a first end and a second end, and a plurality of tines therebetween; and
- a coupler attached to the first end of the first substantially semicircular section and the first end of the second substantially semicircular section such that the first and second substantially semicircular subsections are pivotally coupled together at their respective first ends and movable between an open position wherein the respective second ends are spaced-apart from each other such that the working tool may be freely removed from the hub body, and a closed position wherein the respective second ends are substantially adjacent to each other such that the working tool may be selectively clamped around the hub body for rotation with the hub body.

24. The garden implement of claim 23, further comprising a selectively adjustable fastener couplable to the respective second ends of the first and second substantially semicircular subsection to allow a user to adjust the force at which the working tool is clamped around the hub body.

25. A garden implement comprising:
- a frame comprising a first end portion including at least one axle supporting member, and a second end portion comprising a handle;
- a hub motor assembly comprising a horizontal non-rotating shaft, a hub motor mounted on the shaft for rotation thereabout, and a hub body encompassing the hub motor and operative to be rotatably driven by the hub motor, the shaft protruding laterally outward from the hub body on a left and right side thereof, the at least one axle supporting member being selectively couplable to the shaft;
- a working tool couplable to the hub body, the working tool comprising a plurality of working tool segments serially coupled together and removably mountable in a position extending circumferentially about the hub body and configured to engage soil and rotate with the hub body as the hub body is rotatably driven by the hub motor; and
- a power supply module coupled to the frame and operatively coupled to the hub motor to provide electrical power thereto.

* * * * *